United States Patent
King et al.

(10) Patent No.: US 10,921,132 B2
(45) Date of Patent: Feb. 16, 2021

(54) METHOD TO DETERMINE SEARCH AREA FOR A PERSON OF INTEREST BASED UPON PAST ROUTE INFORMATION FROM SEARCHERS

(71) Applicant: MOTOROLA SOLUTIONS, INC, Chicago, IL (US)

(72) Inventors: Melanie King, Hollywood, FL (US); Shervin Sabripour, Plantation, FL (US); Craig Siddoway, Davie, FL (US); Goktug Duman, Oakland Park, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 432 days.

(21) Appl. No.: 15/659,999

(22) Filed: Jul. 26, 2017

(65) Prior Publication Data
US 2019/0033081 A1    Jan. 31, 2019

(51) Int. Cl.
| | |
|---|---|
| G01C 21/00 | (2006.01) |
| G01C 21/28 | (2006.01) |
| G01C 21/36 | (2006.01) |
| H04L 29/08 | (2006.01) |
| H04W 4/024 | (2018.01) |
| G01C 21/20 | (2006.01) |
| H04W 4/029 | (2018.01) |
| G01C 21/34 | (2006.01) |
| H04W 4/90 | (2018.01) |

(52) U.S. Cl.
CPC ............ *G01C 21/28* (2013.01); *G01C 21/20* (2013.01); *G01C 21/3626* (2013.01); *H04L 67/12* (2013.01); *H04L 67/18* (2013.01); *H04W 4/024* (2018.02); *H04W 4/029* (2018.02); *G01C 21/3407* (2013.01); *H04W 4/90* (2018.02)

(58) Field of Classification Search
CPC .... G01C 21/28; G01C 21/20; G01C 21/3626; G01C 21/3407; H04W 4/024; H04W 4/029; H04W 4/90; H04L 67/12; H04L 67/18
USPC ........................................................ 701/533
See application file for complete search history.

(56) References Cited

U.S. PATENT DOCUMENTS

| | | | |
|---|---|---|---|
| 9,832,605 B1* | 11/2017 | Anderson | H04W 4/023 |
| 10,043,229 B2* | 8/2018 | Hanna | G06Q 50/265 |
| 2005/0216182 A1 | 9/2005 | Hussain et al. | |
| 2010/0262367 A1* | 10/2010 | Riggins | G06Q 10/10 701/533 |
| 2012/0190386 A1* | 7/2012 | Anderson | G01C 15/04 455/456.3 |

(Continued)

FOREIGN PATENT DOCUMENTS

EP    2995909 A1    3/2016

*Primary Examiner* — Masud Ahmed
(74) *Attorney, Agent, or Firm* — Daniel R. Bestor

(57) ABSTRACT

A method and server for determining the current location of a person of interest (POI) is provided. The server receives a first indication that a first searcher has identified a POI and requests first route information from the first searcher. Upon receiving the first route information from the first searcher, the server determines if second route information relating to the person of interest has been received from a second searcher. If so, the server determines a search area for the person of interest based at least in part upon the first route information and the second route information.

14 Claims, 2 Drawing Sheets

(56) References Cited

U.S. PATENT DOCUMENTS

| | | | |
|---|---|---|---|
| 2012/0282884 A1* | 11/2012 | Sun | H04M 11/04 |
| | | | 455/404.2 |
| 2014/0118140 A1* | 5/2014 | Amis | G08B 25/08 |
| | | | 340/539.13 |
| 2014/0278085 A1 | 9/2014 | Zuo | |
| 2014/0328512 A1 | 11/2014 | Gurwicz et al. | |
| 2016/0018230 A1 | 1/2016 | Neubecker et al. | |

* cited by examiner

METHOD TO DETERMINE SEARCH AREA FOR A PERSON OF INTEREST BASED UPON PAST ROUTE INFORMATION FROM SEARCHERS

BACKGROUND OF THE INVENTION

Public safety personnel often face situations where they are searching for a person of interest. Examples include trying to locate a missing child and trying to find a suspect in a criminal investigation.

Due to limited resources and vast areas to cover, it can be difficult for public safety personnel to be successful in their searches for persons of interest.

Public safety personnel can increase the number of people looking for the person of interest. However, if the person of interest is a criminal suspect, public safety personnel may not want to expose non-public safety personnel to the danger associated with searching for a wanted person.

It can be helpful to have non-public safety personnel report any times that they have seen a person of interest. Unfortunately, the reports can be indefinite and inaccurate. In addition, if these reports are via phone calls to a hotline number, then public safety personnel have to be assigned to answer the hotline and are therefore unavailable to perform searching for the person of interest.

Therefore a need exists for a method to leverage sightings of persons of interest by the general public without requiring a public safety office to answer a telephone hotline.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
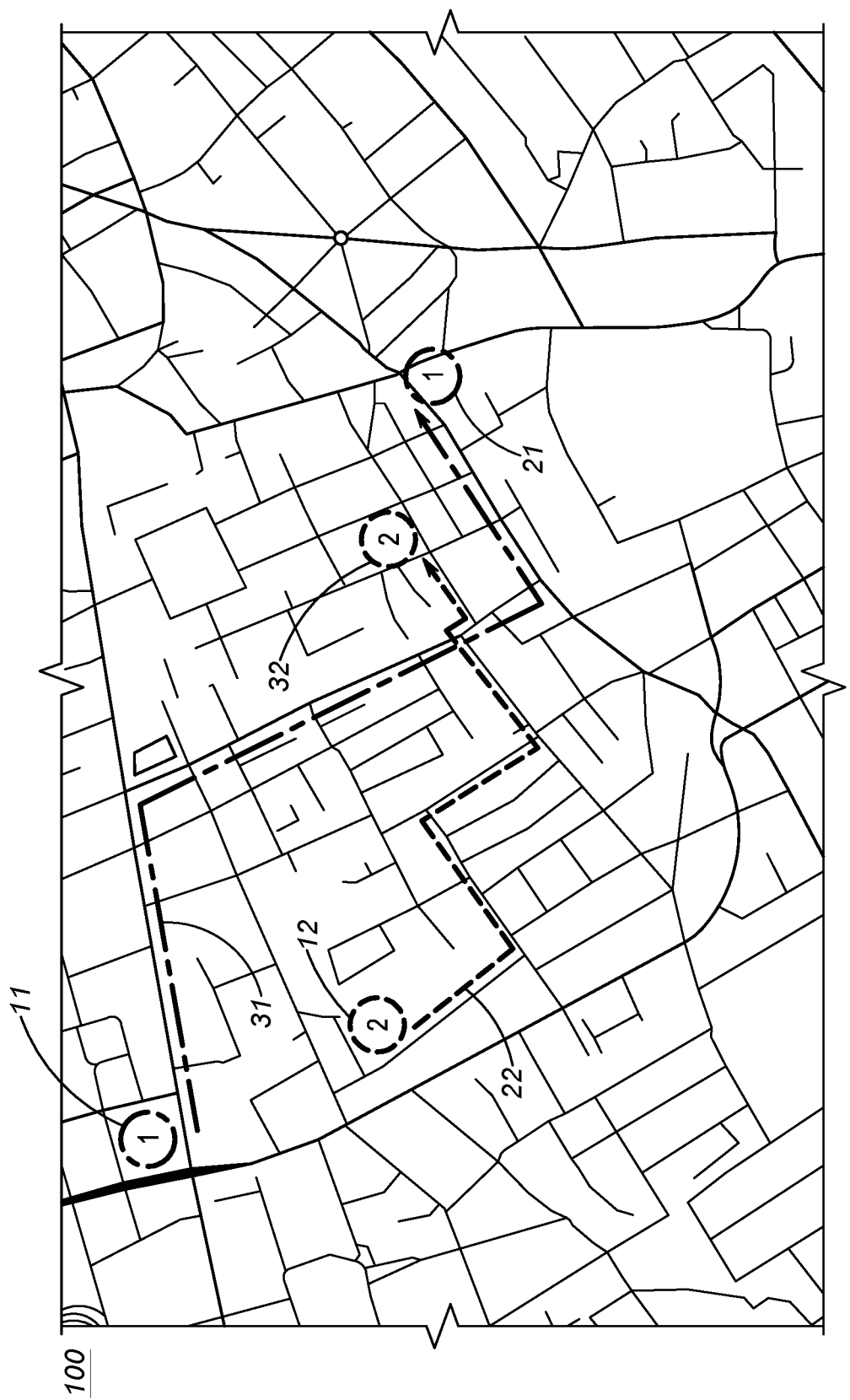
FIG. 1 depicts a map diagram of a first searcher and a second searcher in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment of the present invention provides a method and server for determining the current location of a person of interest (POI). The server receives a first indication that a first searcher has identified a POI and in response requests first route information from the first searcher. The server receives the first route information from the first searcher and determines if second route information relating to the POI has been received from a second searcher. If second route information has been received, the server determines a search area for the person of interest based at least in part upon the first route information and the second route information.

FIG. 1 depicts a map diagram 100 of a first searcher 1, a second searcher 2, and a person of interest (POI) 3 in accordance with an exemplary embodiment of the present invention.

Searchers 1 and 2 are mobile devices, such as cell phones, land mobile radios, body cameras, tablets, or any other mobile electronic device that is capable of storing data thereon. Searchers 1 and 2 include tracking software that tracks the movement of searchers 1 and 2 and stores the past locations of searchers 1 and 2. In an exemplary embodiment, this is accomplished using GPS software or the like and memory within the mobile devices.

Searchers 1 and 2 communicate with network equipment. In an exemplary embodiment, the network equipment is a base station. In a second exemplary embodiment, the network equipment comprises bots that are geographically distributed and are mobile and can be moved from location to location as needed.

POI 3 is a subject that is being searched for. In an exemplary embodiment, POI 3 is a person that is being searched for by a public safety agency, such as the police. POI 3 can be a suspect in a criminal investigation, a potential witness, or any other person that law enforcement would like to talk with. In a second exemplary embodiment, POI 3 can be a person that is lost, in danger, or needs to be notified. In this exemplary embodiment, for example, POI 3 could be a missing child, one whose is in danger, or who needs to receive timely and important information.

As depicted in FIG. 1, searcher 1 travels from starting point 11 to destination point 21 along route 31, and searcher 2 travels from starting point 12 to destination point 22 along route 32. In an exemplary embodiment, searcher 1 and searcher 2 are driving in cars along routes 31 and 32, respectively. Routes 31 and 32 typically comprise multiple streets.

Searchers 1 and 2 preferably communicate with servers, not shown in FIG. 1 for clarity purposes. The servers can be, for example, base stations that are part of a cellular communication system. Each communication system typically includes a plurality of base stations. Searchers 1 and 2 can be handed off from a first base station to a second base station within the communication system. Searchers 1 and 2 can be communicating with the same base station or with different base stations. Alternately, the servers can be bots that are located within an area.

Figure 2:
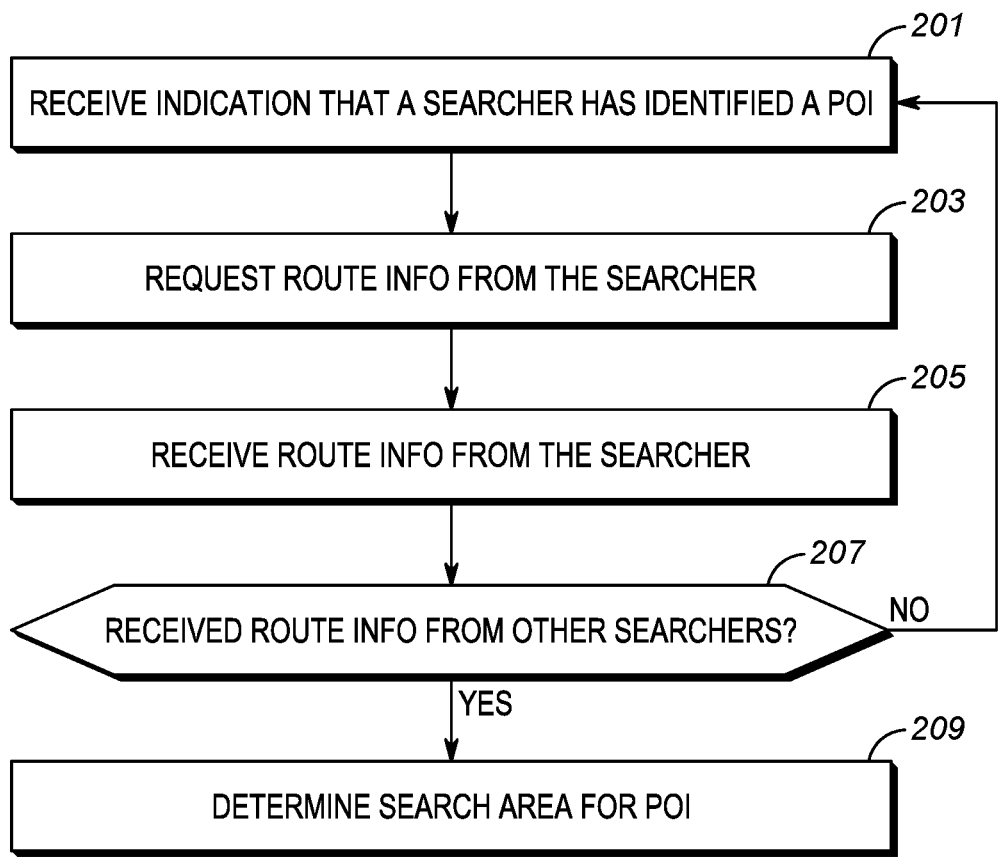
FIG. 2 depicts a flowchart of a method to determine a search area for a person of interest in accordance with an exemplary embodiment of the present invention.

FIG. 2 depicts a flowchart 200 of a method to determine a search area for a person of interest in accordance with an exemplary embodiment of the present invention. In this exemplary embodiment, second searcher 2 has travelled along route 32 to get from starting point 12 to destination point 22. During this trip, searcher 2 has seen POI 3 along route 32. At a later time, first searcher 1 has travelled along route 31 to get from starting point 11 to destination point 21. During this trip, searcher 1 has seen POI 3 along route 31. In this exemplary embodiment, the process would proceed as follows.

A server receives (201) an indication that second searcher 2 has identified POI 3. This preferably occurs when the user of the mobile device 2 has agreed to be part of a volunteer be on the lookout (BOLO) program. For example, the user of mobile device 2 can register for a program that periodically sends the user persons of interest that the user can be looking for. If the user sees the person if interest, the user can alert the initiator of the program that a POI has been spotted. This can occur, for example, by opening an app on mobile device 2 and sending a message to the initiator of the program, such as a local police department. The mobile device of searcher 2 can identify and save the exact location at which the person of interest was seen, preferably by storing the GPS coordinates of mobile device 2 at the time the indication was sent to the server.

Upon receiving the indication from second searcher 2, the server requests (203) route information from second searcher 2. In accordance with an exemplary embodiment, second searcher 2 stores the entirety of the route that it is taking. In this exemplary embodiment, second searcher 2 would store the starting point 11 of this route, the route taken up until the POI was seen, and the GPS coordinates of the location where the user of mobile device 2 spotted the POI.

The server receives (205) the route information from second searcher 2. The route information is stored at the server or in memory that the server can access at a later time.

The server determines (207) if it has received route information from any other searchers. If not, the process returns to step 201 where the server waits to receive information from a searcher.

If the server has received route information from other searchers, the server determines (209) a search area for the POI using at least the two sets of route information received. In an exemplary embodiment, the server determines the search area for the POI using a direction of movement of the person of interest based at least in part upon the first route information and the second route information. In this exemplary embodiment, the server compares the location of the POI from the first sighting to the location of the POI from the second sighting and determines which direction the POI is moving based upon this comparison.

In a second exemplary embodiment, the search area determined by the server has a size that is determined based at least in part upon the distance between the first identification and the second identification. In addition, the time difference between the sightings can also be factored into the determination of the size of the search area. In addition, the mode of transportation used by the POI can also be in determining the size of the search area. For example, if the POI was on foot, the distance the POI could travel within the time difference of sightings can be estimated and the search area can be calculated using this estimation. If the POI was on a bike, the distance traveled on a bike within the time difference can be calculated and used to calculate the search area.

In a further exemplary embodiment, the size of the search area is based at least in part upon the difference between the time of receiving the first indication and the time of receiving the second indication. For example, the size of the search area can be determined based at least in part upon the location of the two sightings and the time between the two sightings. These factors can help determine the direction the POI is travelling and the speed of the POI, which can assist in determining how far the POI could have travelled since the second sighting.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for determining a new search area for a person of interest, the method comprising:
   receiving at a server from a first mobile device associated with a first searcher, a first indication that the first searcher has identified a person of interest and, responsively, requesting first route information from the first mobile device;
   receiving, by the server, the first route information from the first mobile device;
   receiving at the server from a second mobile device associated with a second searcher, a second indication that the second searcher has identified the person of interest and, responsively, requesting second route information from the second mobile device;
   receiving, by the server, the second route information from the second mobile device;
   determining, by the server, a new search area for the person of interest based at least in part upon the received first route information and second route information, wherein a size of the new search area is determined, based on one of i) a determined distance between a location of the first indication and a location of the second indication and ii) a determined difference in time between receiving the first indication and the second indication; and
   sending, by the server, the new search area for the person of interest to a further group of searchers.

2. The method of claim 1, wherein the step of determining the new search area for the person of interest further comprises determining a direction of movement of the person of interest based at, least in part upon the first route information and the second route information.

3. The method of claim 1, wherein the size of the new search area is determined based a determined distance between the location of the first identification and the location of the second identification.

4. The method of claim 1, wherein the size of the new search area is determined based a determined difference in time between receiving the first indication and the second indication.

5. The method of claim 4, wherein the first indication indicates a mode of transportation of the person of interest, and wherein the size of the new search area is based at least in part upon the mode of transportation, of the person of interest.

6. The method of claim 1, wherein the step of sending the new search area to the further group of searchers comprises sending the new search area to the further group of searchers that are located within the new search area.

7. The method of claim 1, wherein the step of sending the new search area to the further group of searchers comprises sending the new search area to the further group of searchers that are located within a predetermined distance of the new search area.

8. A server comprising:
   a communication interface configured to communicate with a plurality of mobile devices; and
   a controller configured to:
      receive, via the communication interface from a first mobile device associated with a first searcher, a first indication that the first searcher has identified a person of interest, and responsively request, via the communication interface, first route information from the first mobile device;
      receive, via the communication interface, the first route information from the first mobile device;
      receive, via the communication interface from a second mobile device associated with a second searcher, a second indication that the second searcher has identified the person of interest and, responsively requesting second route information from the second mobile device;
      receiving, via the communication interface, the second route information from the second mobile device;
      determine a new search area for the person of interest based at least in part upon the received first route information and second route information, wherein a size of the new search area is determined based on one of i) a determined distance between a location of the first indication and a location of the second indication and ii) a determined difference in time between receiving the first indication and the second indication; and
      send, via the communication interface, the new search area for the person of interest to a further group of searchers.

9. The server of claim 8, wherein the controller is configured to, at the step of determining the new search area for the person of interest, determine a direction of movement of the person of interest based at least in part upon the first route information and the second route information.

10. The server of claim 8, wherein the size of the new search area is determined based on the determined distance between the location of the first identification and the location of the second identification.

11. The server of claim 8, wherein the size of the new search area is determined based a determined difference in time between receiving the first indication and the second indication.

12. The server of claim 11, wherein the first indication indicates a mode of transportation of the person of interest, and wherein the size of the new search area is based at least in part upon the mode of transportation of the person of interest.

13. The server of claim 8, wherein the controller is further configured to, at the step of sending the new search area to the further group of searchers, send the new search area to the further group of searchers that are located within the new search area.

14. The server of claim 8, wherein the controller is further configured to, at the step of sending the new search area to the further group of searchers, send the new search area to the further group of searchers that are located within a predetermined distance of the new search area.

\* \* \* \* \*